(12) United States Patent
Schwank et al.

(10) Patent No.: US 12,319,551 B2
(45) Date of Patent: Jun. 3, 2025

(54) DEVICE FOR LIFTING LOADS

(71) Applicant: Siemens Aktiengesellschaft, Munich (DE)

(72) Inventors: Andreas Schwank, Kelsterbach (DE); Peter Janssen, Dieburg (DE)

(73) Assignee: Siemens Aktiengesellschaft, Munich (DE)

( * ) Notice: Subject to any disclaimer, the term of this patent is extended or adjusted under 35 U.S.C. 154(b) by 208 days.

(21) Appl. No.: 17/748,146

(22) Filed: May 19, 2022

(65) Prior Publication Data
US 2022/0411240 A1    Dec. 29, 2022

(30) Foreign Application Priority Data
May 21, 2021    (EP) .................................... 21175276

(51) Int. Cl.
*B66F 3/22*    (2006.01)
*B66F 3/02*    (2006.01)

(52) U.S. Cl.
CPC .................. *B66F 3/22* (2013.01); *B66F 3/02* (2013.01); *B66F 2700/03* (2013.01); *B66F 2700/12* (2013.01)

(58) Field of Classification Search
CPC .... B66F 7/065; B66F 7/28; B66F 7/02; B66F 3/22; B66F 11/042; E04G 1/22
(Continued)

(56) References Cited

U.S. PATENT DOCUMENTS 4,273,242 A * 6/1981 Schaper .................. B66C 13/06
                                                   212/319
4,516,663 A * 5/1985 D'Alessio ............... B66B 9/022
                                                   187/270
(Continued)

FOREIGN PATENT DOCUMENTS

CN  208648629 U  3/2019
DE     3636459    4/1988
(Continued)

OTHER PUBLICATIONS

EP Search Report dated Dec. 16, 2021 based on EP21175288.6 filed May 21, 2021.

*Primary Examiner* — Brian D Keller
*Assistant Examiner* — Jason Khalil Hawkins
(74) *Attorney, Agent, or Firm* — Cozen O'Connor

(57) ABSTRACT

A device for lifting and stabilizing loads which can be stabilized via two crossing, pivotably articulated telescopic struts that are interconnected in a synchronized manner so as to counter undesirable length variations as a result of forces acting in the cross-beam longitudinal direction, wherein connection of the telescopic struts is established via five traction parts, wherein one first traction part in the internal tube of each telescopic strut is mounted at both ends via a respective inner disk and outer disk, where a second traction part is mounted on two rotatable disks horizontally between the telescopic struts, where disks of the respective first and second traction parts each situated on one side are kinetically interconnected to transmit rotational movements between both disks, and where one further traction part is fastened in external tube, the further form-fitting traction part being kinetically connected to the inner disk of the first traction part.

16 Claims, 4 Drawing Sheets

(58) Field of Classification Search
USPC .......................................................... 254/122
See application file for complete search history.

(56) References Cited

U.S. PATENT DOCUMENTS

| | | | |
|---|---|---|---|
| 5,269,728 A | 12/1993 | Rogers et al. | |
| 2007/0252120 A1* | 11/2007 | Assmann | ................ B66C 13/06 |
| | | | 254/264 |
| 2017/0362060 A1* | 12/2017 | Turek | .................... B66B 23/026 |

FOREIGN PATENT DOCUMENTS

| | | |
|---|---|---|
| DE | 102004045516 | 4/2006 |
| DE | 102005038844 | 2/2007 |
| DE | 102010052615 | 5/2012 |
| DE | 102018100776 | 7/2019 |
| DE | 102020003226 | 12/2021 |
| RU | 2385284 C1 | 3/2020 |
| SU | 998321 | 2/1983 |
| WO | WO 2007/048152 | 5/2007 |

\* cited by examiner

A - A

B - B

C - C

DEVICE FOR LIFTING LOADS

BACKGROUND OF THE INVENTION

1. Field of the Invention

The invention relates to an assembly having telescopic struts that are coupled in a synchronized manner and, more particularly, to a device for lifting and stabilizing loads, in particular suspension gear for vehicles or vehicle parts, composed of a frame as well as a cross-beam that lies below the cross-beam and receives the load and, via hoist ropes fastened to the cross-beam, is adjustable for height, and which can be stabilized via two crossing telescopic struts that extend substantially in an imaginary vertical plane parallel to the travel direction of the frame and that are pivotably articulated on the frame, on the one hand, and on the cross-beam, on the other hand.

2. Description of the Related Art

Devices for lifting and stabilizing loads are used, above all, in automotive assemblies to transport vehicle parts or transport the vehicle to be assembled between the individual assembling locations in the respective stage of assembly of the vehicle. For this purpose, the frame is usually horizontally displaceable on a rail; the cross-beam via the hoist ropes articulated thereon is adjustable for height via hoists disposed on the frame.

The suspension of the load ideally should be stable, in particular when the vehicle is one that is provided for assembly. Such as requirement is because many assembly procedures are performed in a fully automated manner that necessitates precise positioning of the carrying device which, in turn, requires the load to be suspended in an ideally stable manner on the cross-beam. Simple rope drives having vertical supporting ropes are not suitable for safely preventing the load from swaying to the same extent in all directions. As a result, articulated arms or scissors are used in addition to the guy ropes, where articulated arms or scissors are articulated on the frame, on the one hand, and on the cross-beam, on the other hand, and stabilize the load without impeding the lifting and lowering movements.

The numerous conventional solutions are complex, heavy and expensive. Thus, a generic device for guiding a load, which is composed of a displaceable frame, so to speak, upon which a cross-beam is articulated so as to be adjustable for height is described in German patent application DE 36 36 459 A1.

In order for functional groups for lifting and lowering loads (i.e., "suspension gear") in the field of material handling to be stabilized, telescopic struts ("telescopes") are often used. An internal tube that is repositioned in an external tube here is retracted or deployed during the lifting or lowering movement. In order for reciprocating movements of the load in and counter to the displacement direction of the frame to be avoided, two such length-adjustable telescopic struts are provided here so as to cross one another between the frame and the cross-beam, where the telescopic struts in the end regions thereof are fastened in an articulated manner to the cross-beam, on the one hand, and to the frame, on the other hand, and serve to absorb the forces that arise in the travel direction of the carrying device.

The lifting of the load in the case of this solution occurs via the hoist ropes that are articulated in the corner regions of the cross-beam and via deflection rollers in the corner regions of the frame that are guided to a lifting unit disposed centrally on the frame. In order for the retraction and deployment movement of the telescopic struts to be synchronized, the telescopic structure stabilized and synchronized via a rope assembly of tensioning ropes.

Such assemblies with rope-based synchronization are disclosed in DE 10 2004 045 516 A1—Aßmann "Device for lifting and stabilizing loads", where a rope guide that synchronizes the movement of the telescopes is chosen such that lateral reciprocating movements are damped.

Disadvantages, for example, because continual twisting and untwisting of the steel ropes typically utilized, and thus stretching of the ropes and wear arises, as a result of the ropes being guided via the pivot bearings of the telescopic struts, are derived from the described effect of the guy ropes in the prior art discussed. The issue in terms of construction thus causes an undesirable longitudinal variation of the telescopic struts as a consequence of forces engaging in the longitudinal direction of the cross-beam. The stretching of the ropes regularly must be compensated for by re-tensioning and periodic adjustment; the same applies to jigging, slippage and other deviations that may arise over time. Moreover, assembling, adjusting and servicing are not trivial matters and are thus expensive and time-consuming.

SUMMARY OF THE INVENTION

In view of the foregoing, it is therefore an object of the present invention to provide a construction for synchronizing the displacement of telescopic struts, where the construction is structurally simple, functional and low-maintenance and where, as a core concept of object in accordance with the invention, bracing and stabilization of the telescopic struts is implemented with the aid of five form-fitting traction structure (e.g., toothed belts).

These and other objects and advantage are achieved in accordance with the invention by an assembly comprising a device for lifting and stabilizing loads, in particular a suspension gear for vehicles or vehicle parts, composed of a frame as well as a cross-beam that lies below the cross-beam and that receives the a load and via a lifting structure fastened to the cross-beam that is adjustable for height, and that can be stabilized via two crossing telescopic struts that extend substantially in an imaginary vertical plane parallel to the displacement direction of the frame, which are pivotably articulated on the frame, on the one hand, and on the cross-beam, on the other hand, which each case have one internal tube and one external tube and in turn are connected to one another for synchronized retraction and deployment so as to counter undesirable length variations as a result of forces acting in the cross-beam longitudinal direction.

The connection of the telescopic struts here is established by five form-fitting traction structure, where in each case one first form-fitting traction part in the internal tube of a telescopic strut is in each case mounted at both ends via a respective inner disk and an outer disk, where a second form-fitting traction part (toothed belt) is mounted on two rotatable disks so as to be horizontal between the two telescopic struts, where the two rotatable disks of the respective first form-fitting traction part and of the second form-fitting traction part that are each case situated on one side are kinetically connected to one another such that rotational movements between both disks can be transmitted, and where one further form-fitting traction part is fastened in each of the two external tubes, the form-fitting traction structure being kinetically connected to the inner disk of the respective first form-fitting traction part such that a rotating movement of these first disks leads to a corresponding displacement of the respective telescopic strut. As a result of this principle, both internal tubes are displaced in a synchronous manner both during retraction as well as during deployment of the telescopic struts. This prevents any undesirable longitudinal variation of the telescopic struts as a result of forces engaging in the cross-beam longitudinal direction and the construction is self-stabilizing. This solution having form-fitting traction structure prevents slippage and does not require periodic readjustment. Moreover, the traction structure is not twisted during lifting/lowering; this solution thus has particularly little wear.

The first form-fitting traction part in each case is advantageously formed by a toothed belt, and the inner and the outer disks are configured as toothed belt pulleys. This results in silent and uniform running. Moreover, toothed belts are stable in the long term, such that periodic readjustment by virtue of instances of stretching of the traction structure is often dispensed with.

In one alternative embodiment, the first form-fitting traction part in each case is formed by a chain, and the inner and the outer disks are configured as sprockets. Chains here can often transmit higher forces than toothed belts. Moreover, chain solutions can often also be used in the case of problematic operating conditions. Depending on the requirements, solutions containing a mix of chains and toothed belts can also be used. Depending on the use conditions, toothed belts, chain solutions or else rotary transmissions (e.g., shaft drives having deflection gearboxes on both sides), or combinations thereof, can be selectively used for the second form-fitting traction part, thus the "transverse connection" for transmitting the information pertaining to the movement between the telescopic struts; in this context all these solutions can be referred to as a form-fitting traction structure.

An embodiment that is particularly silent-running and low-maintenance results when an open toothed belt is in each case provided as the further form-fitting traction part in each of the telescopic struts, where this toothed belt in the longitudinal direction is braced substantially on the internal wall of the external tube of the respective telescopic strut and via a pair, which is adjacent to the mounting of the respective inner disk, of deflection rollers that are fastened to the internal tube is guided over a toothed belt pulley that is kinetically connected to the inner disk and thus converts a rotating movement of the inner disk into a linear displacement of the respective telescopic strut. As a simple and effective construction for transmitting force, the inner disk and the toothed pulley kinetically connected thereto here are each disposed in a force-fitting or form-fitting manner on a common rotation axis.

A construction that is an alternative thereto and is particularly resilient provides that, as the further form-fitting traction part, a rack is in each case provided in the longitudinal direction of the telescopic strut in each of the telescopic struts, where a pinion kinetically connected to the inner disk is disposed in the internal tube so as to engage in the rack of the external tube, thus providing a conversion of a rotating movement of the inner disk into a linear displacement of the telescopic strut. The rack is advantageously formed by a separate rack assembled on the internal wall of the external tube or alternatively as a result of depressions incorporated or machined, respectively, in the inner wall of the external tube. In the embodiment with the separate rack the latter can be fastened to the external tube via slotted screw connections so that it is possible for the telescopic strut to be precisely adjusted by a longitudinal displacement of the rack.

In the present embodiment, the inner disk and the pinion are also each advantageously disposed in a form-fitting and/or force-fitting manner on a common rotation axis. In particular with a view to the adjustment in the course of the initial assembly, but also for maintenance purposes, at least on one side it is advantageous for the outer disk of the first traction part and that disk of the second traction part that is disposed on this side to be connected via a coupling, where the coupling is specified to at least partially decouple the outer disk of the first traction part and the disk of the second traction part.

In one advantageous embodiment the coupling can be configured as a safety coupling, where the safety coupling is specified to at least partially decouple when a critical torque is exceeded. A destruction of other components, in particular of toothed belts or chains, can thus be prevented in the event of load peaks. The safety coupling in a simple and effective construction is formed by a shear pin or a feather key having a predetermined breaking point, where, in the closed state of the safety coupling, a transmission of a rotating movement of at least one of the disks to the respectively adjacent disk of the other traction part is provided via the shear pin or the feather key.

In one embodiment, the pivot bearings of the internal tubes, the outer disks and the second traction part having the assigned rotatable disks are disposed on a lower cross-beam of the device, and the pivot bearings of the external tubes are articulated on the upper frame. In this way, most of the maintenance jobs can be performed with a lowered lifting device, so as to be readily accessible close to the ground.

In contrast, in an alternative embodiment the pivot bearings of the internal tubes, the outer disks and the second traction part having the assigned rotatable disks are disposed on the upper frame of the device, and the pivot bearings of the external tubes are articulated on the lower cross-beam. In this way, installation space on the lower cross-beam can be saved. Moreover, the second traction part having the drive elements (disks) is better protected in relation to collisions in the lower region.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of a telescopic strut according to the invention will be explained hereunder by way of the drawings, in which.

DETAILED DESCRIPTION OF THE EXEMPLARY EMBODIMENTS

Figure 1:
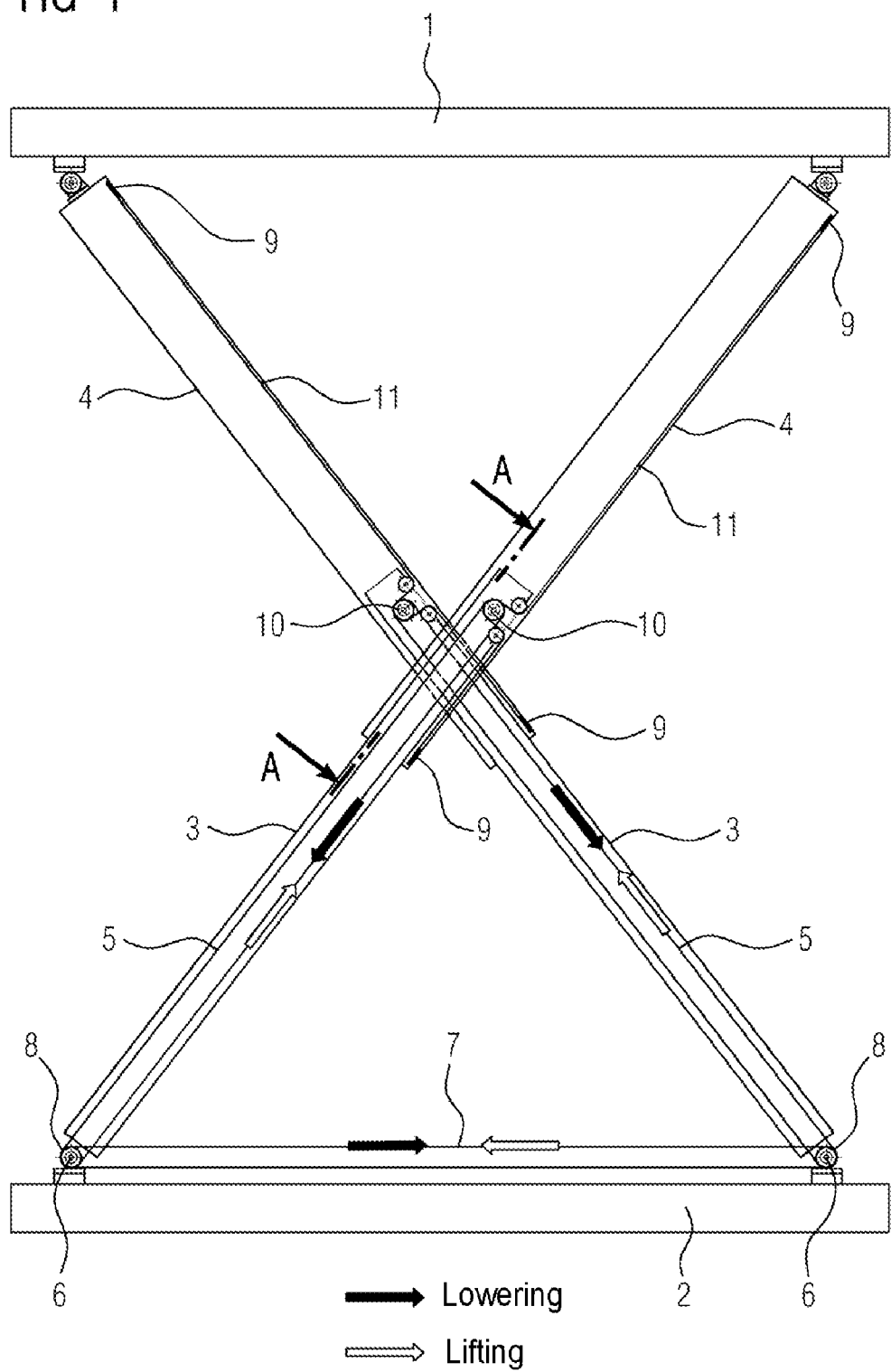
FIG. 1 shows a lateral view (sectional illustration) of the lowered device in accordance with the invention.

FIG. 1 shows an assembly for stabilization for a lifting device/suspension gear, or similar, in which ropes or belts (not shown in FIG. 1) are used as lifting structure between the upper frame 1 and the cross-beam 2 ("lower frame"). Transverse movements (swaying) of the lower cross-beam 2 must be prevented in particular in the lowered state. To this end, FIG. 1 shows bracing and stabilizing of telescopic struts via five form-fitting traction structures 5, 7, 11, where the telescopic struts are disposed so as to cross one another between the upper frame 1 and the cross-beam 2 and are composed of an internal tube 3 and an external tube 4. For this purpose, toothed belts are used here. Alternatively, the toothed belts 11 can be replaced by a rack assembly and the toothed belts 5, 7 can be replaced by chains or other traction or transmission structure.

Two of the five form-fitting traction structures 5 (toothed belts), as "first traction part", are each mounted at both ends in the internal tube 3 of a telescopic strut via in each case two disks 6 (outer disk) and 10 (inner disk)—presently: toothed belt pulleys. A second form-fitting traction part 7 (toothed belt) is likewise mounted on two rotatable disks 8 (presently: toothed belt pulleys) so as to be horizontal between the two telescopic struts above the lower frame 2. The disks 6, 8 that are situated on one side are mounted such that rotating movements can be transmitted between both disks 6, 8. A further traction part 11 (toothed belt) in the two internal tubes 4 is in each case fastened and tensioned to the end of the tube using clamping plates 9. The toothed belt (further traction part 11) is guided via a toothed belt pulley ("deflection"), which is installed parallel to the inner disk 10 and connected to the latter, and two adjacent deflection rollers, and drives the deflection, thus the toothed belt pulley, during the telescopic movement. When the internal tube 3 in a first telescopic strut is retracted or deployed, the toothed belt pulley ("deflection"), and conjointly therewith also the toothed belt pulley 10, begins to rotate. The rotating movement is transmitted to the disks 6 and 8 and thus to the second form-fitting traction part 7 (toothed belt) by the traction structures 5 (toothed belt). This second form-fitting traction part 7 likewise begins to move in the same direction and in turn transmits the rotating movement to the disk 8 on the opposite side. As a result, the rotating movement is directed onward to the outer disk 6 which is mounted in the second telescopic strut above the lower frame and is connected to the disk 8. The transmitted rotating movement leads to a movement, as a translatory movement, of the traction structures 5 in the internal tube 3 there, and by way of the inner disk 10 and the deflection thereon, which is connected thereto, to the toothed belt 11 thereon, the latter being fastened in this external tube 4 using clamping plates 9, as a result of which the external tube 4 and the internal tube 3 move (are displaced) relative to one another.

Figure 2:
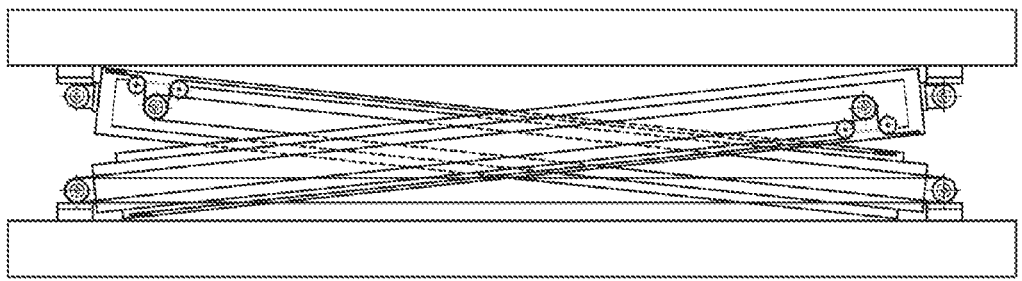
FIG. 2 shows the device in the retracted (lifted) state in accordance with the invention.

FIG. 2 shows the assembly from FIG. 1 in a state with retracted telescopic struts.

Figure 3:
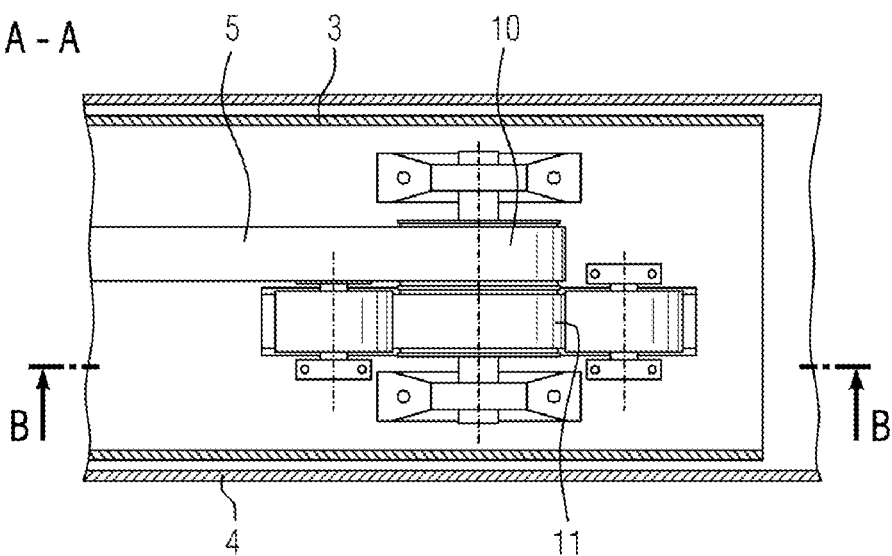
FIG. 3 shows a plan view (section plane A-A) of an inner disk and a disk of the further traction part in the "toothed belt" embodiment.

FIG. 3 shows a plan view along the section plane A-A indicated in FIG. 1. Here, the inner disk 10 with the deflection are illustrated assembled on a common rotation axis; both disks are connected to one another in a form-fitting or force-fitting manner.

Figure 4:
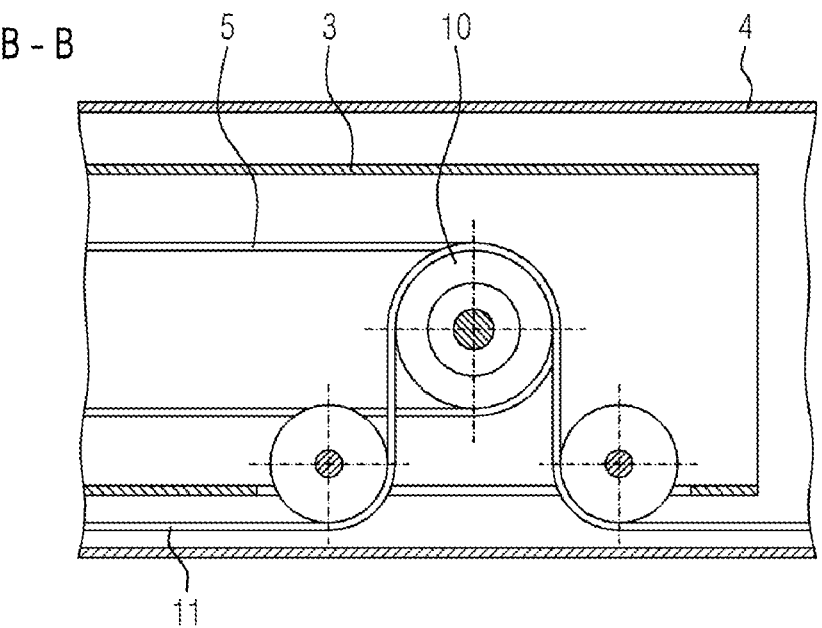
FIG. 4 shows a sectional illustration of the section plane B-B from FIG. 3.

FIG. 4 along the plane B-B indicated in FIG. 3 shows a lateral view of the rotation axis having the disk 10, the deflection, the traction structure 5, 11 and the deflection rollers.

Figure 5:
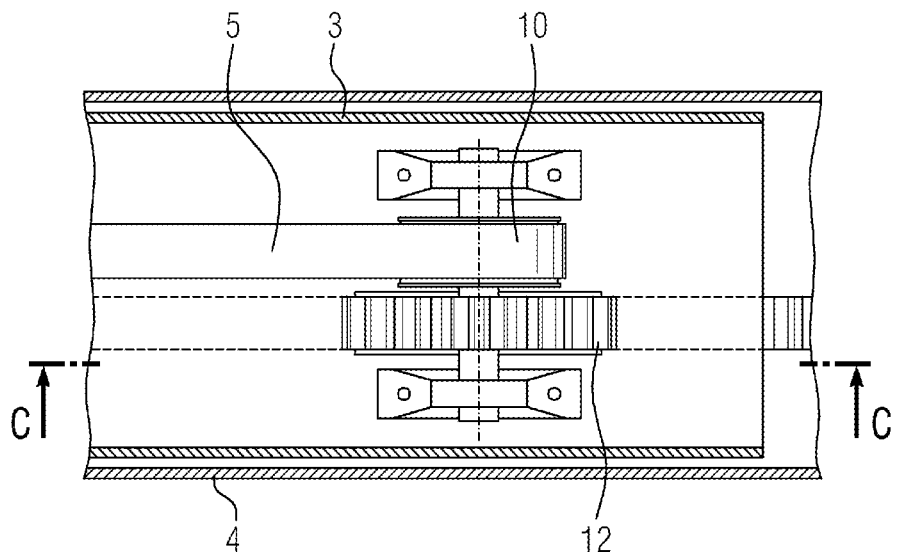
FIG. 5 shows a plan view (section plane A-A) of an inner disk and a disk of the further traction part in the "rack" embodiment.

FIG. 5 shows the alternative embodiment in which the further traction part is formed as a rack or similar, and the deflection is formed by a pinion 12 engaging in the rack.

Figure 6:
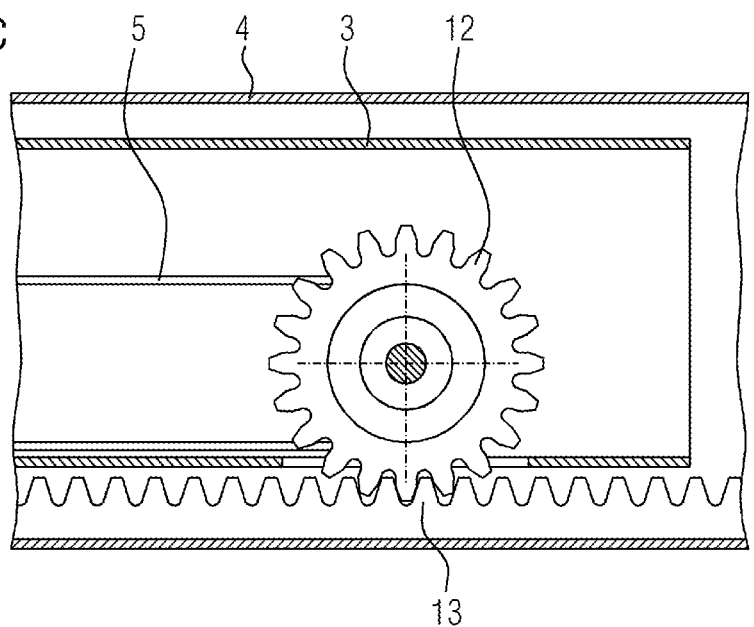
FIG. 6 shows a sectional illustration of the section plane C-C from FIG. 5.

FIG. 6 shows a lateral view along the plane C-C indicated in FIG. 5. The inner disk for the traction structure 5 in this view is obscured by the deflection (pinion 12). The pinion 12 engages in a form-fitting manner in the rack 13, the latter here being used as a further form-fitting traction part. Instead of a separate rack, the toothing can also be machined directly as a contour on the inside in the external tube.

In one advantageous embodiment, the guiding of the internal tube in the external tube of the telescopic strut occurs with sliding blocks instead of the otherwise often customary roller bearings or ball bearings, where the sliding blocks are simple to manufacture. For easy assembly, these sliding blocks are pushed into corresponding openings in the external tube from the outside, and guide the internal tube. The sliding blocks are preferably produced from a material with positive frictional properties, such as a plastics material. This is a low-maintenance embodiment. As a result of assembling occur from the outside, any readjustment (for example, by replacing spacers between the external tube and a bearing face of the sliding blocks/sliders), or a replacement of the sliding blocks, is readily possible. This moreover results in play-free and silent running.

As a result of the above-described construction and the embodiments thereof discussed, both internal tubes 3 are displaced in a synchronous manner when the telescopic struts are retracted as well as deployed. This prevents any undesirable variation in length of the telescopic struts as a result of forces acting in the cross-beam longitudinal direction; the construction is self-stabilizing and swaying back and forth of the lower cross-beam, in particular in the lowered state, is minimized or prevented.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for lifting and stabilizing loads, comprising:
   a frame;
   a cross-beam arranged below the frame, the device receiving the load and, via lifting structure fastened to the cross-beam, being adjustable for height, and being stabilized via two crossing telescopic struts which extend substantially in an imaginary vertical plane parallel to a displacement direction of the frame and which are pivotably articulated on the frame and pivotably articulated on the cross-beam, each of the crossing telescopic struts having one internal tube and one external tube and being connected to one another in a synchronized manner so as to counter undesirable length variations as a result of forces acting in a longitudinal direction of the cross-beam;

wherein the connection of the two telescopic struts to each other is established via five form-fitting traction parts;

wherein one respective first form-fitting traction part in the internal tube of a respective telescopic strut is mounted at both ends via a respective inner disk and a respective outer disk;

wherein a second form-fitting traction part is mounted at both ends on the respective inner disk, the second form-fitting traction part being arranged entirely above the cross-beam so as to be horizontal between the two telescopic struts;

wherein the respective outer disk and the respective inner disk of the respective first traction part and the second form-fitting traction part which are each situated on one side are concentrically and coaxially aligned, and kinetically connected to one another such that rotating movements between the respective outer disk and the respective inner disk are transmittable; and wherein one further form-fitting traction part is respectively fastened in each of the two external tubes, said further form-fitting traction part being kinetically connected to the respective inner disk of the respective first traction part such that a rotational movement of the respective inner disk of the respective first traction part leads to a corresponding displacement of the respective telescopic strut.

2. The device as claimed in claim 1, wherein the first traction part is formed as a toothed belt, and the inner and the outer disks are configured as toothed belt pulleys.

3. The device as claimed in claim 1, wherein the first traction part is formed by a chain, and the inner and the outer disks are configured as sprockets.

4. The device as claimed in claim 1, wherein an open toothed belt is provided as the further form-fitting traction part in each of the telescopic struts; and wherein the open toothed belt in the longitudinal direction is braced substantially on an internal wall of an external tube of the respective telescopic strut and via a pair, which is adjacent to a mounting of the respective inner disk, of deflection rollers which are fastened to the internal tube is guided over a toothed belt pulley which is kinetically connected to the inner disk and converts a rotating movement of the inner disk into a linear displacement of the telescopic strut.

5. The device as claimed in claim 4, wherein the inner disk and the toothed pulley kinetically connected thereto are disposed on a common rotation axis.

6. The device as claimed in claim 1, wherein, as the further form-fitting traction part, a rack is in each case provided in the longitudinal direction of the telescopic strut in each of the telescopic struts; and wherein a pinion kinetically connected to the inner disk is disposed in the internal tube so as to engage in a rack of the external tube to provide a conversion of a rotational movement of the inner disk into a linear displacement of the telescopic strut.

7. The device as claimed in claim 6, wherein the rack is one of (i) formed by a separate rack assembled on the internal wall of the external tube and (ii) formed as a result of periodic depressions incorporated in the inner wall of the external tube.

8. The device as claimed in claim 6, wherein the inner disk and the pinion are each disposed on a common rotation axis.

9. The device as claimed in claim 7, wherein the inner disk and the pinion are each disposed on a common rotation axis.

10. The device as claimed in claim 1, wherein the outer disks of the respective first traction part and of the second traction part which are each situated on one side are disposed on a common axis.

11. The device as claimed in claim 1, wherein at least on one side the outer disk of the first traction part and that disk of the second traction part which is disposed on this side are connected via a coupling; and wherein the coupling is set to at least partially decouple the outer disk of the first traction part and the disk of the second traction part.

12. The device as claimed in claim 11, wherein the coupling is formed as a safety coupling which is set to at least partially decouple when a critical torque is exceeded.

13. The device as claimed in claim 12, wherein the safety coupling has a predetermined breaking point; and wherein, in a closed state of the safety coupling, a transmission of a rotational movement of at least one of the disks to the respectively adjacent disk of the other traction part is provided via the safety coupling.

14. The device as claimed in claim 1, wherein the outer disks and the second traction part having the assigned rotatable disks are disposed on the cross-beam of the device.

15. The device as claimed in claim 1, wherein the pivot bearings of the internal tubes, the outer disks and the second traction part having the assigned rotatable disks are disposed on the frame of the device.

16. The device as claimed in patent claim 1, wherein the load to be stabilized comprises suspension gear for vehicles or vehicle parts.

* * * * *